US005471897A

United States Patent [19]
Wright

[11] Patent Number: 5,471,897
[45] Date of Patent: Dec. 5, 1995

[54] SAW SHARPENER

[75] Inventor: James L. Wright, Cottage Grove, Oreg.

[73] Assignee: Wright Machine Tool Company, Inc., Cottage Grove, Oreg.

[21] Appl. No.: 119,988

[22] Filed: Sep. 10, 1993

[51] Int. Cl.$^6$ ................................................. B23D 63/12
[52] U.S. Cl. ............................ 76/37; 76/41; 76/43
[58] Field of Search ................................ 76/37, 41, 43, 76/112

[56] References Cited

U.S. PATENT DOCUMENTS

| | | |
|---|---|---|
| 1,224,293 | 5/1917 | Foley . |
| 1,475,351 | 11/1923 | Phillips . |
| 1,490,668 | 4/1924 | Herbert . |
| 2,429,292 | 10/1947 | Ouellet . |
| 3,611,839 | 10/1971 | Idel et al. . |
| 3,802,299 | 4/1974 | Idel . |
| 3,890,857 | 6/1975 | Simington ............................ 76/37 |
| 3,929,040 | 12/1975 | Idel . |
| 4,587,869 | 5/1986 | Hamer .................................. 76/37 |

FOREIGN PATENT DOCUMENTS

| | | | |
|---|---|---|---|
| 3537059 | 5/1986 | Germany ............................... 76/37 |
| 4415879 | 7/1969 | Japan .................................... 76/37 |
| 1641531 | 4/1991 | U.S.S.R. ............................... 76/37 |
| 1701448 | 12/1991 | U.S.S.R. ............................... 76/37 |

OTHER PUBLICATIONS

Armstrong Manufacturing Co., Portland, Oreg. 97208—"Armstrong Automatic Band Saw Sharpeners", pp. 1–8, Section 1 ands pp. 16–A and 16–B, Section 2 Armstrong Filing Clamps.

*Primary Examiner*—Hwei Siu Payer
*Attorney, Agent, or Firm*—Edward B. Anderson

[57] ABSTRACT

A sharpener frame is supported relative to a floor and has a front side. A first portion of a band saw is supported at the front side of the frame. A second portion of the band saw is also supported relative to the frame, parallel with the first portion of the band saw, and also at the front side of the frame in one of two locations. Each location is on a different side of the first supported portion of the band saw. A clamp for the band saw tooth being sharpened includes a pair of plates having upper edges generally conforming to the profile of a saw tooth for clamping a substantial portion of the tooth in a fixed position relative to the frame during sharpening. The plates are released after sharpening for positioning a different tooth between the plates. A coolant supply system moves a liquid coolant through channels in the plates that have outlets adjacent to the tooth edge for cooling the tooth during sharpening. A grinding wheel is moved along the tooth upper edge following a predetermined path representative of the tooth profile for grinding the edge of the supported tooth while the tooth is held in the fixed position.

9 Claims, 14 Drawing Sheets

SAW SHARPENER

BACKGROUND OF THE INVENTION

1. Field of the Invention

This invention relates to saw sharpeners, and in particular, to such sharpeners for sharpening teeth of a band or circular saw using an automatically controlled grinding wheel.

2. Related Art

Both band and circular saws are used in lumber mills to cut logs into dimensional lumber. The band saws are typically made in left and right-hand versions so that the return runs or loops of the bands are spaced away from the log being cut and the cutting runs are spaced closely and in parallel to cut a slice of wood having a predetermined thickness. Other sets of band saws cut other portions of the log. Circular saws are typically used to cut the wood after it has been cut into boards. The preferred embodiment of the present invention is designed to sharpen both circular saws and band saws. The following discussion and disclosure are directed specifically to band saws. However, various aspects of the invention are also applicable to circular saws.

The bands are typically 18 to 60 feet long in a continuous loop and have a width of 4 inches to 16 inches. A typical sharpener, such as a Motor Driven No. 4 Automatic Precision Band Saw Sharpener made by Armstrong Manufacturing Co. of Portland, Oreg., sharpens either a left or right-hand band saw. The band saw passes through a sharpening zone or station on the front of the sharpener and extends around behind the sharpener.

The band saw is supported at spaced locations along its length away from the sharpener on post brackets. The saw is moved around in the loop configuration by an indexing mechanism in the sharpener and in a back feed unit that drives the return loop behind the sharpener.

During loading, these units require the return run of the band saw to be lifted over the entire sharpener to get it behind the sharpener. Further, it is preferable to have both left and right hand sharpeners for sharpening left and right hand band saws. One type of sharpener can be used for both left and right-hand saws, however, if the operator is willing to operate the sharpener while standing inside the loop of the band.

The conventional sharpeners also have a grinding wheel that is moved in the plane of the grinding wheel relative to a band saw being sharpened as the band saw is moved through the sharpening zone. The grinding wheel moves according to rotation of a cam that is coordinated with movement of the band saw. The amount of grinding is controlled by manually operated cranks, and consistency of the sharpening depends on operation of the control crank and the shape of the grinding wheel when it is dressed. The resulting sharpness of the band saw is also dependent upon the coordination of movement of the band saw and grinding wheel.

Hot spots on the band saw result from excessive grinding. Such hot spots result when too much grinding occurs at a single location, and results from misadjustment of the sharpener and vibration of the band saw by the grinding wheel. These hot spots are weak and can result during use in fractures or cracks, typically in the gullet between saw teeth. These cracks are due to the band bending as it travels around band wheels, the tension placed on the band, and the cutting loads imposed by the tooth as it shears wood fiber.

In an attempt to prevent the occurrence of hot spots a stream of coolant has been directed into the sharpening zone. However, the high rate of rotation of the grinding wheel, typically in the range of 1800 to 5000 rpm, causes a layer of air next to the wheel to move with the wheel. This layer of air prevents the coolant from getting to the wheel/band saw contact area, and as a result has been found to be relatively ineffective.

As has been mentioned, one of the reasons for the development of hot spots on band saws is the vibration that occurs during contact of the grinding wheel with the band saw. The band saw is clamped below the level of the teeth so that the teeth are fully exposed as they travel past the grinding wheel. Since the grinding wheel is at a fixed location in the general loop of the band saw, the tooth cannot be clamped and still have the opening or gullet between the teeth exposed during sharpening.

SUMMARY OF THE INVENTION

The present invention overcomes these disadvantages of know conventional band saw sharpeners. In particular, various features of the invention provide for sharpening both left and right-hand band saws in the same sharpening station, supporting the return run of the band saw adjacent to the sharpening station, providing coolant directly to the band saw for improved cooling of the teeth during sharpening, and supporting each tooth being sharpened by a clamp that generally conforms to the shape of the band saw teeth.

In one aspect of the invention, a sharpener is provided that supports a first length of a band saw with the edge of a tooth exposed in a sharpening zone. A grinding wheel is moved in the sharpening zone relative to the exposed tooth. The band saw is moved in a band direction through the sharpening zone for presenting the teeth successively for sharpening. A second length of the band saw is supported adjacent to the sharpening zone with the lengths of the band saw between the first and second lengths forming loops spaced from the sharpening zone.

A preferred form of this aspect of the invention also provides for supporting a length of the return run of left and right-hand band saws on opposite sides of the sharpening zone. This allows for either type of band saw to be sharpened in the sharpening zone.

In another aspect of the invention, the sharpener braces at least one side of a tooth of a band saw with the edge of the tooth exposed in a sharpening zone during sharpening. Preferably this is in the form of a clamp having plates conforming to and supporting both sides of the tooth. This reduces the vibration of the tooth during sharpening, thereby improving the sharpness of the tooth and reducing the development of hot spots.

Also preferably, at least one plate supporting the tooth has channels for conducting a coolant fluid to the tooth. This can provide cooling by passing the coolant along the face of the tooth, as well as by outputting the fluid adjacent to the tooth edge being sharpened. The supporting plate itself also serves as a heat sink, reducing the generation of hot spots on the tooth during sharpening.

The invention also provides a sharpener in which each band saw tooth is held in a fixed position relative to a sharpener frame during sharpening. The grinding wheel is then moved along the tooth upper edge following a predetermined path corresponding to the tooth profile for grinding the edge of the supported tooth. This assures further improved sharpening by minimizing movement of the tooth during sharpening and moving only the grinding wheel along substantially identical tooth profiles.

The preferred embodiment of the invention automatically sharpens teeth having a known profile. A frame is supported relative to a floor and has a front side. A first portion of the band saw is supported in a sharpening zone at the front side of the frame. A second portion of the band saw is also supported relative to the frame, parallel with the first portion of the band saw, and also at the front side of the frame in one of two locations. Each location is on a different side of the first supported portion of the band saw for accommodating different types of band saws.

A clamp for the tooth being sharpened includes a pair of plates having upper edges generally conforming to the profile of the tooth. The pair of plates are pressed toward each other with the first portion of a saw positioned between the plates and the top edge of a tooth of the saw extending above the upper edges of the plates during sharpening, whereby a substantial portion of the tooth is supported between the plates in a fixed position relative to the frame. The plates are released after sharpening for positioning a different tooth between the plates. A coolant supply system moves a liquid coolant through channels in the plates and open to the face of the tooth, with outlets adjacent to the tooth edge for cooling the tooth during sharpening.

The grinding wheel is moved along the tooth upper edge following a predetermined path corresponding to the tooth profile for grinding the edge of the supported tooth while the tooth is held in the fixed position. Between tooth sharpenings, the first portion of the band saw is moved in a first direction relative to the frame for positioning teeth successively between the plates for sharpening, and the second portion of the band saw is moved in the opposite direction relative to the frame.

These and other features and advantages of the present invention will be apparent from the following detailed description of the preferred embodiment of the invention and the accompanying drawings.

DETAILED DESCRIPTION OF THE PREFERRED EMBODIMENT

Figure 1:
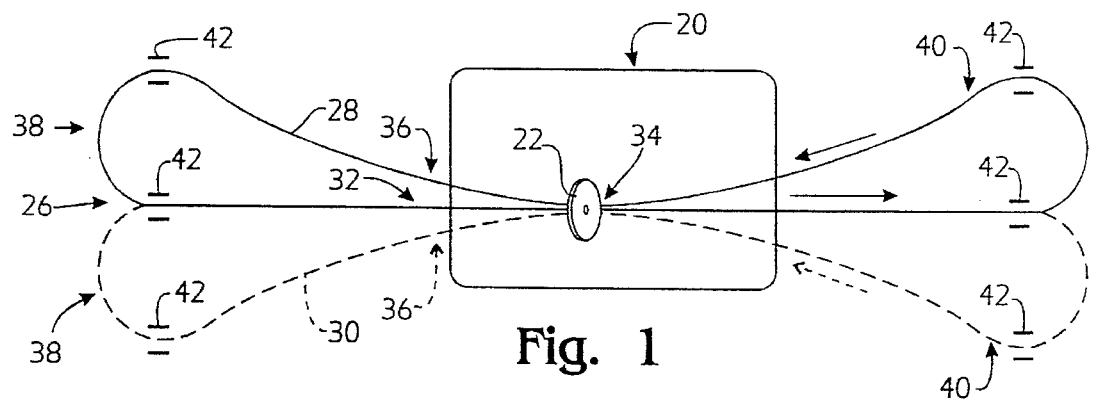
FIG. 1 is a simplified illustration of an overhead view of a band saw sharpener made according to the invention showing alternative band saw configurations.
Figure 3:
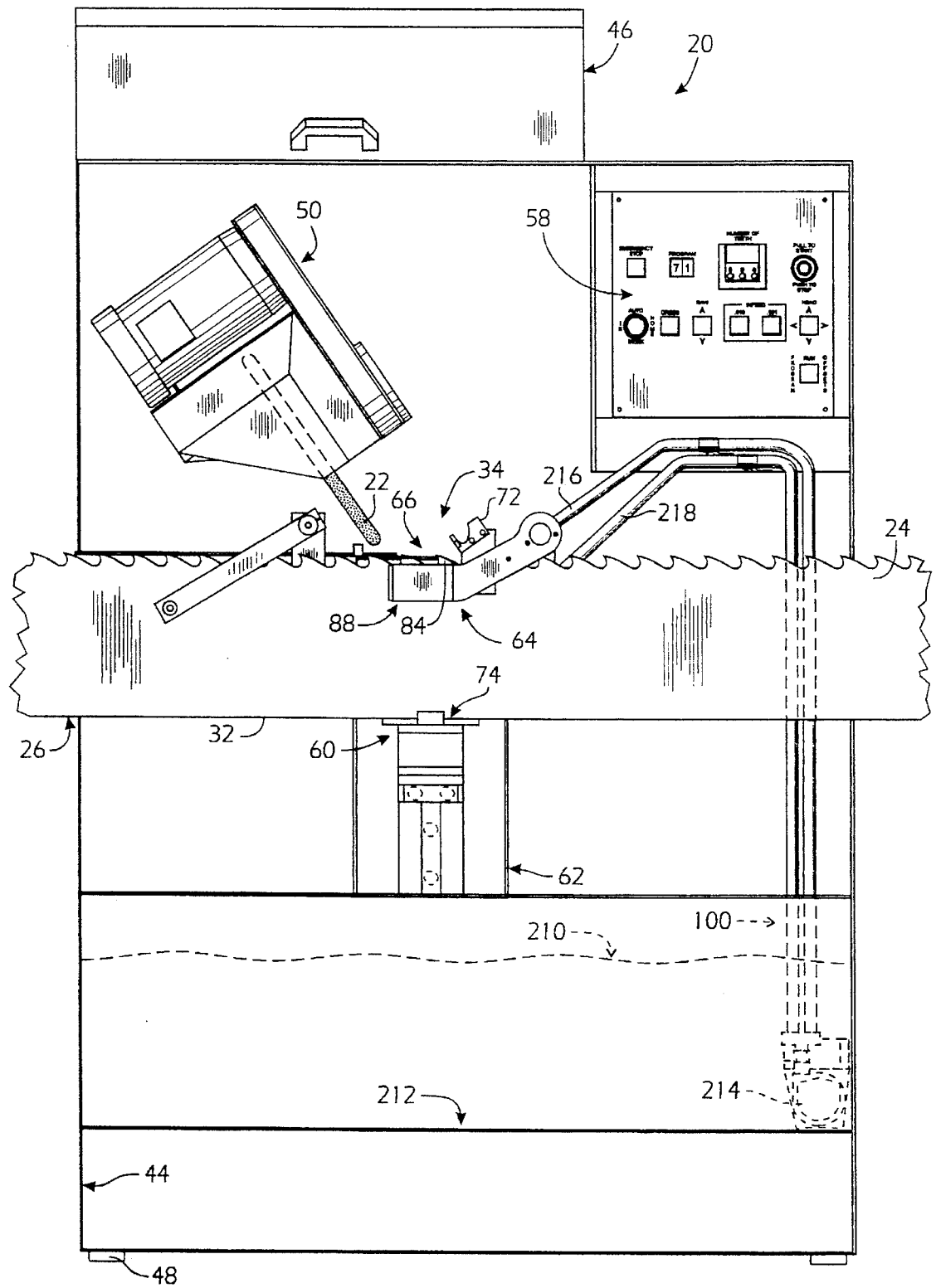
FIG. 3 is a front view similar to FIG. 2 also showing a primary run of a band saw in place for sharpening and a portion of a coolant system.

Referring initially to FIG. 1, a sharpener 20 made according to the invention has a grinding wheel, represented by wheel 22, for grinding the teeth, such as tooth 24 shown in FIG. 3, of a band saw shown generally at 26. The band saw may be either a left-hand band saw 28 shown in solid lines or a right-hand band saw 30 shown in dashed lines.

As used herein, each band saw 26, regardless of which type, is considered to have a primary run 32 that passes through a sharpening station 34 for sharpening, a return run 36 that is not sharpened as it passes adjacent to the sharpening station in sharpener 20, and outer loops 38 and 40 connecting the primary and return runs. The outer loops are supported in position by conventional band stands, such as band stand 42.

The continuous band of the band saw is moved progressively, between tooth-sharpening operations, around in what is referred to as a band direction. A left-hand band 28 thus moves in a counterclockwise direction, as viewed in FIG. 1. This is then the band direction for a left-hand band. Correspondingly, a right-hand band saw 30 travels in a clockwise band direction. In either case, the primary run 32 travels to the right and the return run 36 travels to the left relative to sharpener 20 as shown in FIG. 1, or as the sharpener is viewed from the front, as shown in various of the other drawings.

Figure 2:
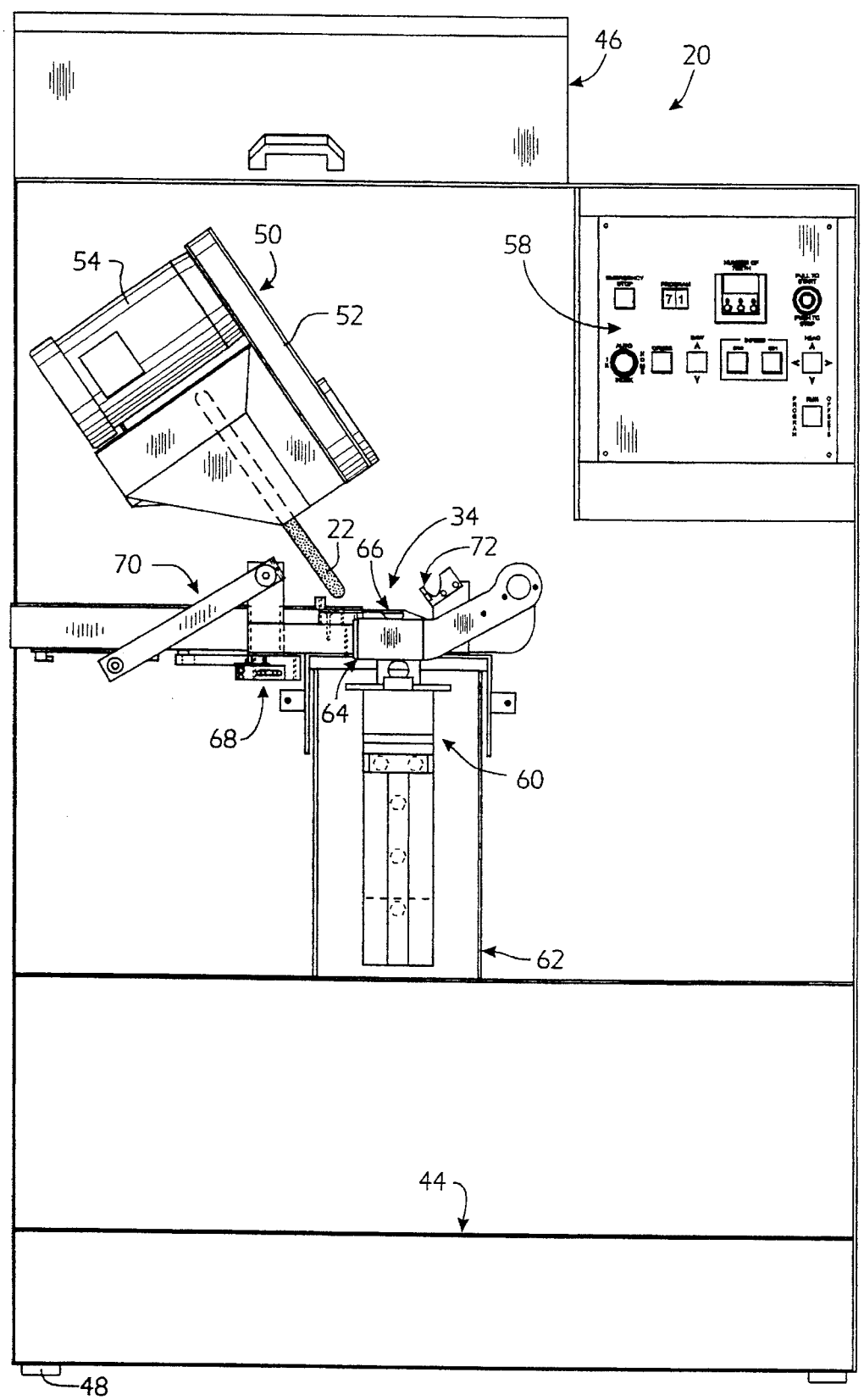
FIG. 2 is a front view of a portion of the sharpener of FIG. 1.

Referring now generally to FIGS. 2–7, and in particular initially to FIG. 2, sharpener 20 includes a frame 44 supporting a cabinet 46 supported on a floor (not shown) by feet 48. For simplicity of illustration, the figures only include selected structures. Although the mounting of these structures relative to the frame and necessary supporting apparatus, such as a hydraulic system for driving moving members are not always shown, it is understood that these are accomplished using appropriate conventional apparatus and techniques.

A grinding wheel assembly 50, including grinding wheel 22, is mounted for rotation relative to a supporting chassis 52 and is driven by a motor 54 at preferably between 2000 and 4000 rpm. The control of motion of the grinding wheel is described subsequently with reference to FIGS. 14–19.

The sharpening functions provided by sharpener 20 are provided by a conventional computer numeric controller (CNC) 56 (illustrated in FIG. 4) mounted to the frame, with manual interface and control provided by a control panel 58, described subsequently in further detail with reference to FIG. 19. The band saw is supported by a carrier 60 mounted on a saw lift 62 driven by a lead screw and electric motor, not shown. The band saw is held in position during sharpening in the sharpening station 34 by a clamp assembly 64, described in further detail with reference to FIGS. 4, 5, 7 and 11–13. The primary saw run is advanced through the sharpening station by a primary index assembly 66, and the return runs of left and right-hand band saws are advanced in a reverse direction relative to frame 44 by respective return index assemblies 68 and 70. Also, as often as determined by the user, the grinding wheel may be automatically dressed by a diamond dresser 72 under the control of controller 56.

Band saw 26 is supported on carrier 60 by a primary band saw support 74. Support 74 includes a base 76 on which the back of the band saw rests and a pair of opposing braces 78 and 80, shown more particularly in FIG. 5. Outer brace 80 is retractable during loading to allow insertion of the primary run 32 of band saw 26.

Figure 4:
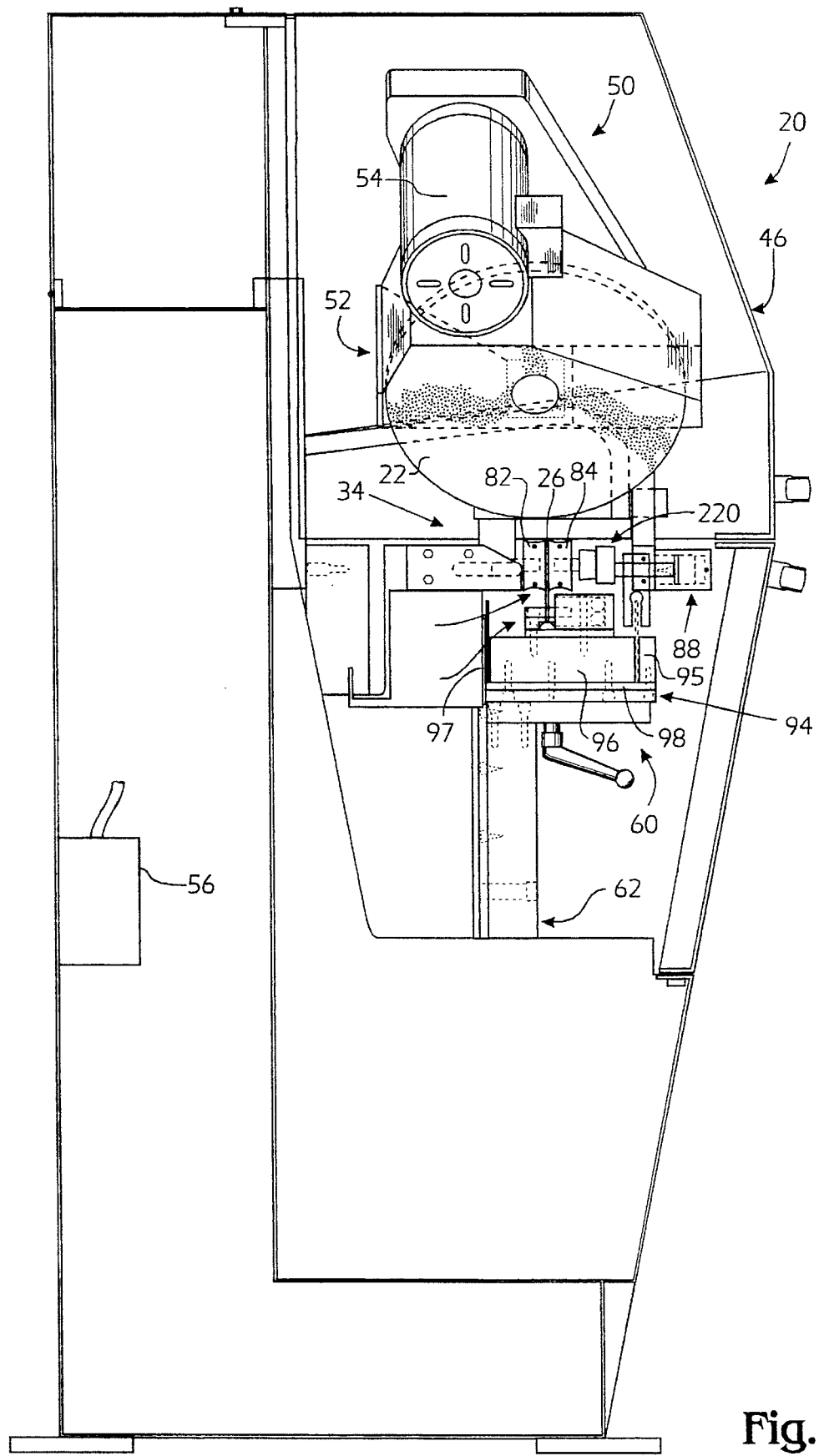
FIG. 4 is a simplified end view similar to an end view taken from the left end of FIG. 3 showing the band saw carrier and clamping assembly.

FIGS. 3 and 4 both show carrier 60 in a raised position for sharpening. The saws in the two figures have different heights for convenience of illustration. Clamp assembly 64 includes a fixed plate or jaw 82 and a movable plate or jaw 84. These jaws securely sandwich the portion of the primary run associated with a tooth 24' in position for sharpening, as shown in FIG. 4.

Figure 5:
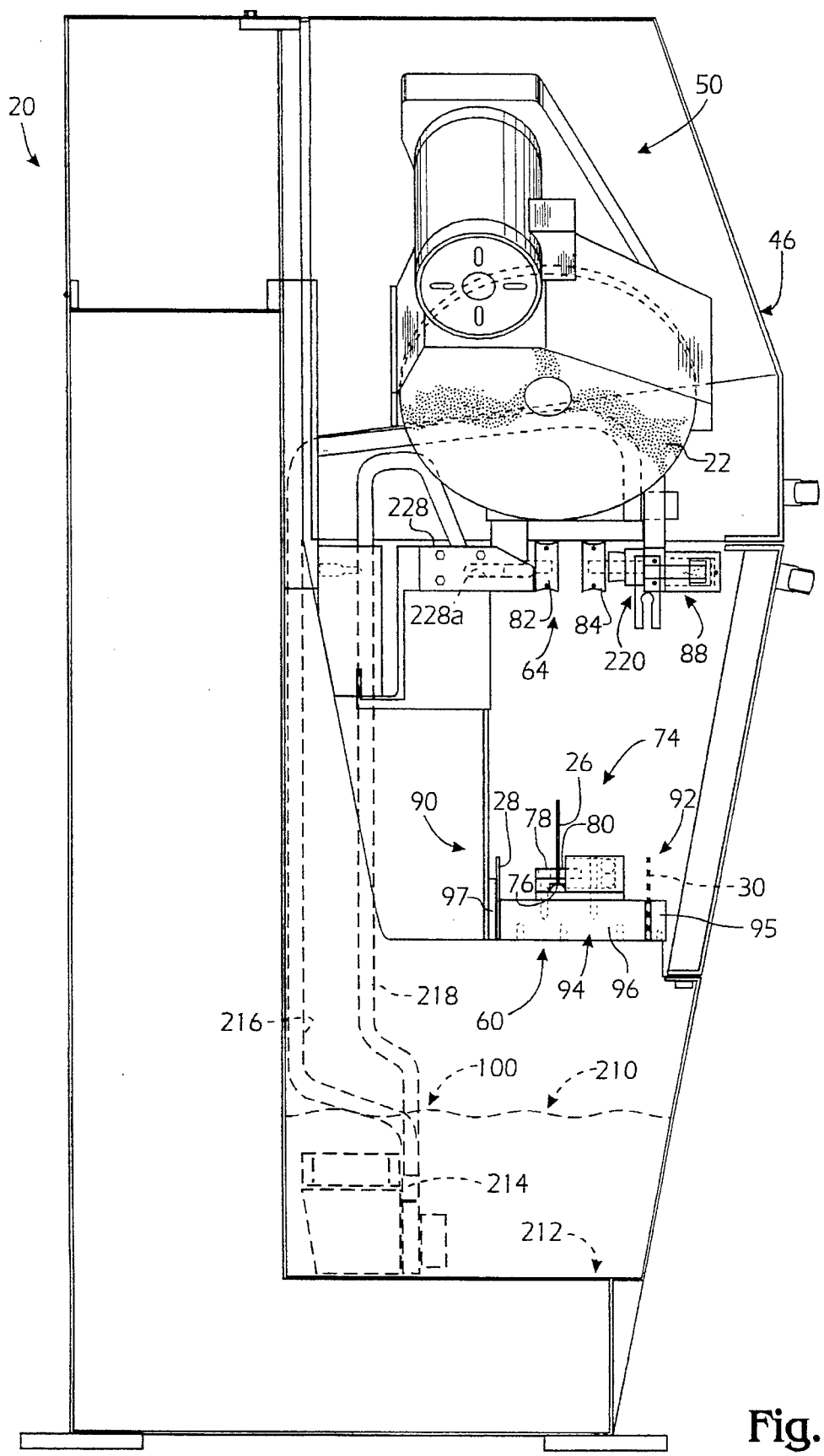
FIG. 5 is an end view similar to the end view of FIG. 4 showing the coolant system and with the band saw carrier in a fully lowered position for loading and unloading the band saw.

FIG. 5 shows movable jaw 84 retracted from jaw 82 by a hydraulic retractor assembly 88. Also, carrier 60 is shown in a lowered position with a band saw 26 loaded in primary support 74. The return run of a left-hand saw blade 28 is shown supported in an inner support 90. An alternative, outer support 92 supports the return run of a right-hand saw blade 30, shown in dashed lines. These inner and outer supports are in the form of channels formed in a support base 94 formed by elements 95, 96, 97 and 98.

Figure 6:
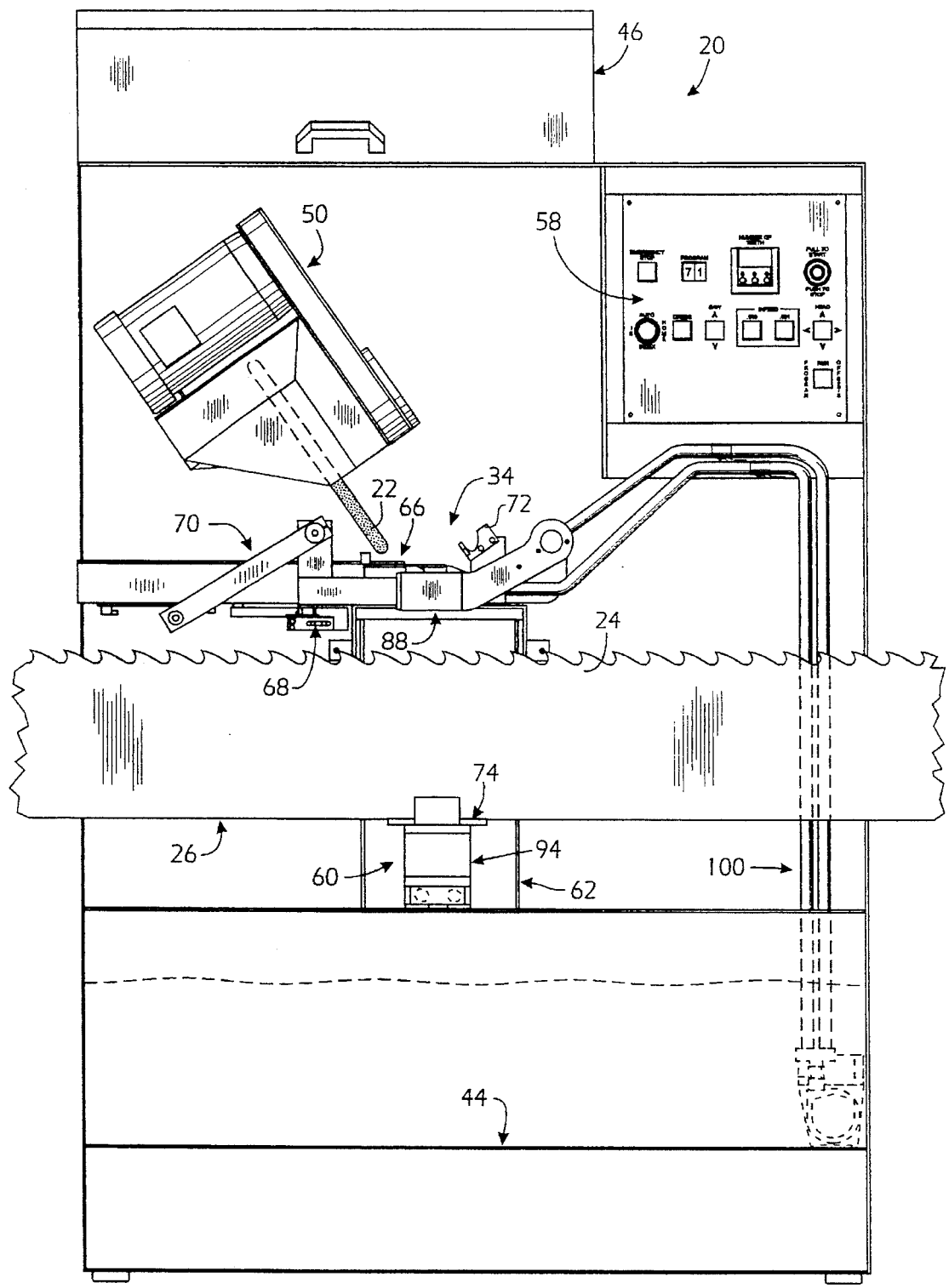
FIG. 6 is a front view similar to FIG. 3 showing the primary run of the band saw in a partially raised position.

FIG. 6 shows a front view of the sharpener with band saw 26 supported in primary support 74 and carrier 60 partially raised toward the sharpening position (or conversely, partially lowered toward the loading or fully lowered position).

Figure 7:
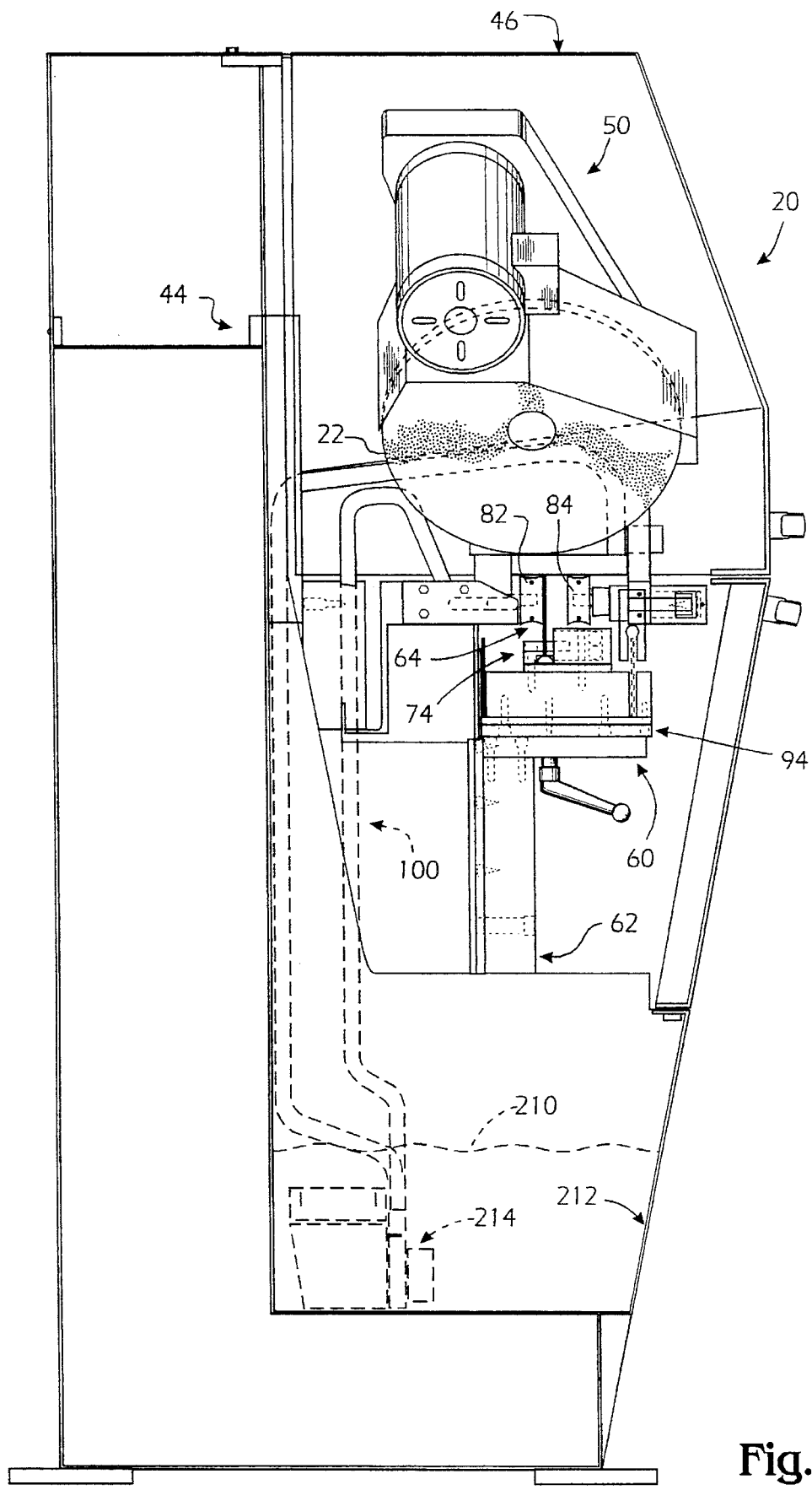
FIG. 7 is an end view similar to FIG. 4 with the addition of the coolant system and showing the band saw carrier in a fully raised position and with a movable jaw of a band saw clamp in an open position for loading and unloading the band saw.

In FIG. 7, carrier 60 is in the sharpening position for the size of band shown. The carrier is raised until the teeth of the band saw are in the desired position between clamp jaws 82 and 84. In this figure, movable jaw 84 is in a retracted position, which is used to allow loading and unloading of a band saw.

Figure 8:
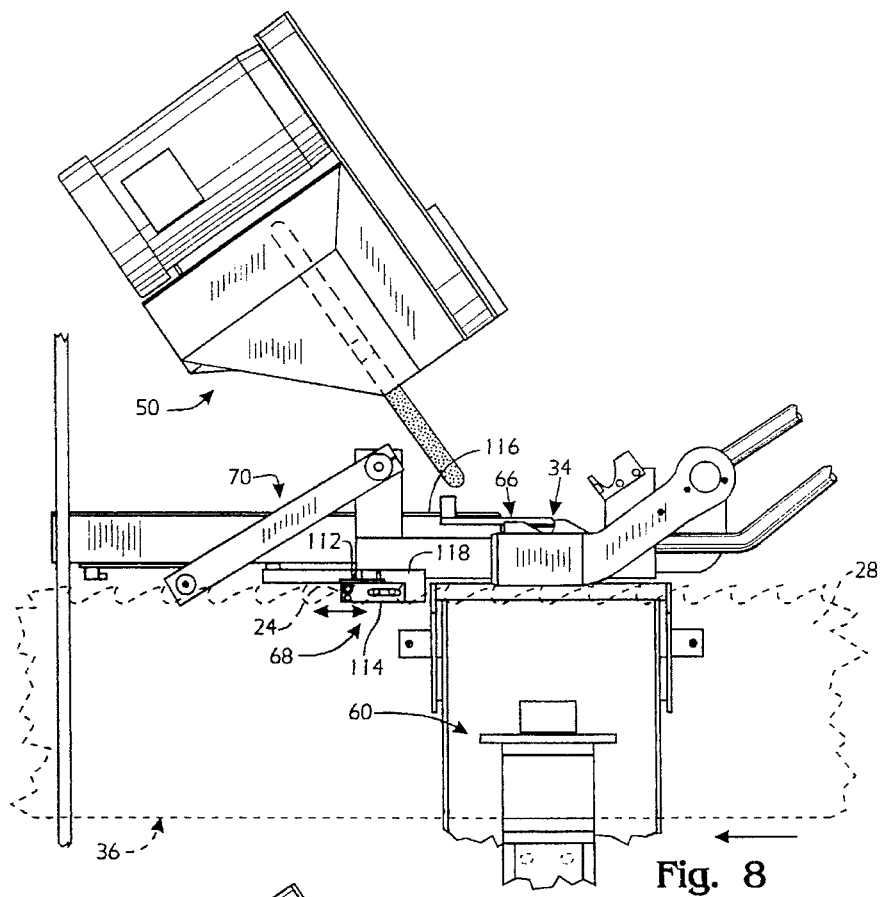
FIG. 8 is an enlarged front view similar to FIG. 3 showing the sharpening station with the position of an inner return run of a left-hand band saw shown in dashed lines.
Figure 9:
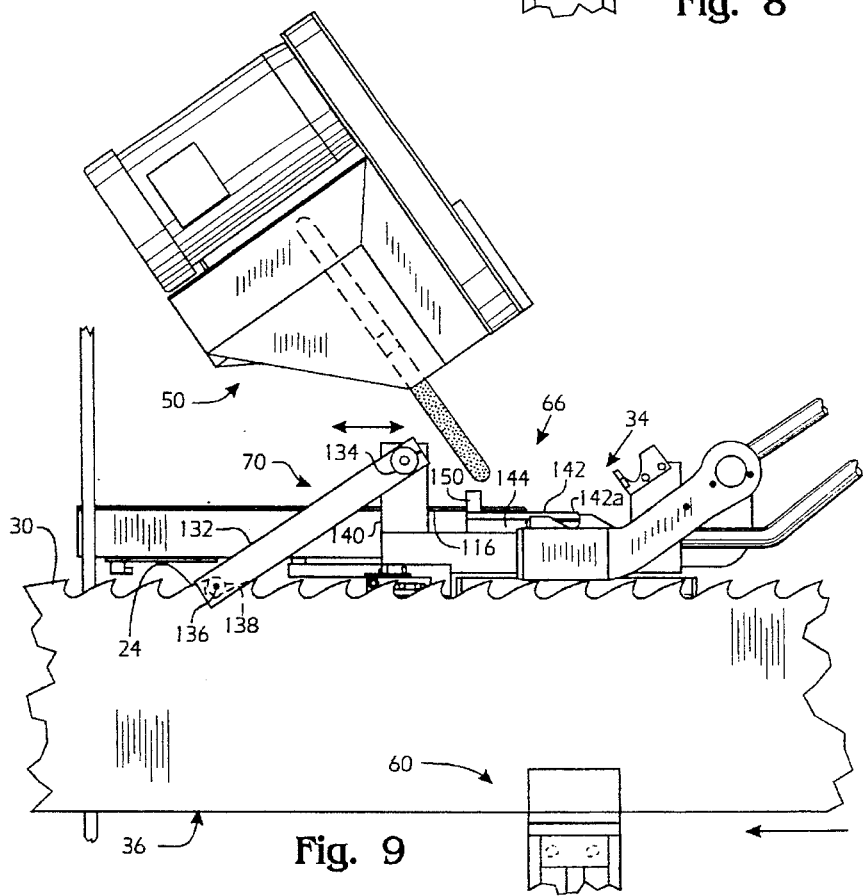
FIG. 9 is a view similar to FIG. 8 showing the position of the outer return run of a right-hand band saw shown in solid lines.

The alternative positions of return runs of the left and right-hand band saws are not shown in FIGS. 6 and 7, for simplicity of illustration. FIGS. 8 and 9 show sharpening station 34 with carrier 60 in a sharpening position. As is particularly shown in FIG. 4, the return run of the band saw is at a slightly reduced elevation in order to allow room for clamp assembly 64 and a coolant system 100 described below.

FIG. 8 shows return run 36 of a left-hand band saw 28 in dashed lines. This rear return run is indexed by rear index apparatus 68 to index the band saw one tooth to the left each time the primary run is indexed to the right. As shown more clearly in dashed lines in FIG. 10, which shows a top view of the sharpening station and indexing mechanisms, apparatus 68 includes an indexing finger 112 supported for pivoting on a base 114 toward and away from the plane of the band saw. The finger, functioning like a spring pawl, is urged in a counterclockwise direction as viewed in FIG. 10 by a spring 115 for engaging an edge of a band saw tooth, as shown in FIG. 8.

Base 114 is mounted to an indexing carriage plate 116 by a vertical bar 118. Plate 116 is reciprocatingly driven along the runs of a band saw by a rod 120 driven pneumatically by an air cylinder 122 attached to frame 44. Rod 120 is drivingly coupled to plate 116 by mounting bracket 124.

As shown in FIG. 8, the left, distal end of finger 112 selectively engages the forward face of a tooth 24. When plate 116 is slid to the left during indexing, the distal end of finger 112 engages a tooth and forces the return run of the band saw the distance of one tooth to the left. Plate 116 and index assembly 68 are then returned to the right. During this movement, the end of finger 112 slides along the band saw causing the finger to pivot away from the tooth until it is aligned with the gullet of the next tooth. When this happens, there is no resistance to the action of spring 115, and the finger end pivots into the gullet with the leading edge in engagement with the next tooth edge.

Figure 10:
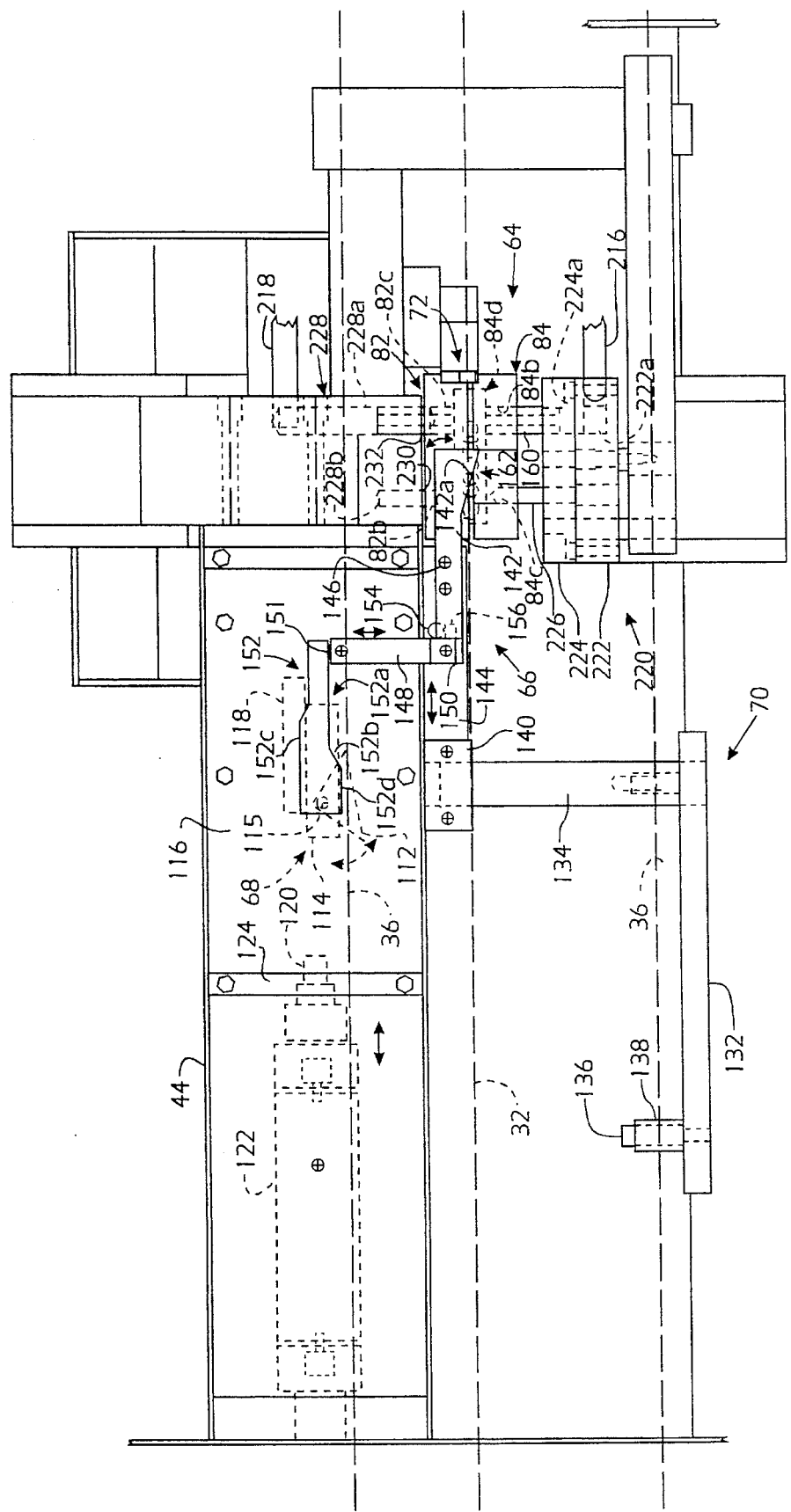
FIG. 10 is a top view of the sharpening station and band saw indexing assemblies.

Similarly, as shown in FIGS. 9 and 10, a front return run 36 of a band saw 30, shown in solid lines in FIG. 9, is indexed by front indexing apparatus 70. Apparatus 70 includes a swing arm 132 mounted for pivoting about a horizontal axis on a horizontal pivot arm 134. The distal end of swing arm 132 supports a pin 136 extending laterally of the arm over the band saw. Pin 136 supports a roller 138 that rides on the teeth of the saw. Swing arm 132 extends over the band saw from, and is fixedly mounted to a vertical support bar 140. Bar 140 is attached to and moves with plate 116.

As is seen in FIG. 9, roller 138 engages the gullet or forward face of a tooth 24. As plate 116 moves to the left as viewed in the figures, roller 138, presses against a tooth 24 and forces the band saw to the left. When the carriage plate returns to the right, the roller rolls up over the top of the next tooth and drops down into the gullet on the right side of the tooth where it is in position for advancing the return run of the band saw to the left on the next band saw indexing cycle.

Primary run 32 of a band saw 26, regardless of whether it is a left-hand saw 28 or a right-hand saw 30, is indexed by primary index assembly 66. The primary index assembly includes a main feed finger 142 pivotingly attached to a base 144 at a spring-biased pivot pin 146. Pin 146 is biased by a spring, not shown, to position a tip 142a of the feed finger toward a position engaging saw 26 as shown in FIG. 10. Base 144 is fixedly attached to carriage plate 116.

A drive arm 148 is attached fixedly to finger 142 via a vertical bar 150. The distal end of arm 148 has a roller 151 mounted for contacting a ramp element 152 mounted fixedly relative to frame 44. The front face 152a of the ramp element serves as a guide for roller 151 and has a ramp section 152b that transitions from a recessed section 152c to a protruding section 152d.

As carriage plate 116 moves to the left, indexing the return run of the band saw as has been described, finger tip 142a sweeps along the face of the saw. As the roller moves across ramp section 152b the tip 142a of the finger is withdrawn from engagement with the tooth to prevent engaging a second tooth on small-tooth-pitched saws. The carriage plate and main feed finger are held in this position during sharpening, as shown in FIGS. 17 and 18.

Figure 16:
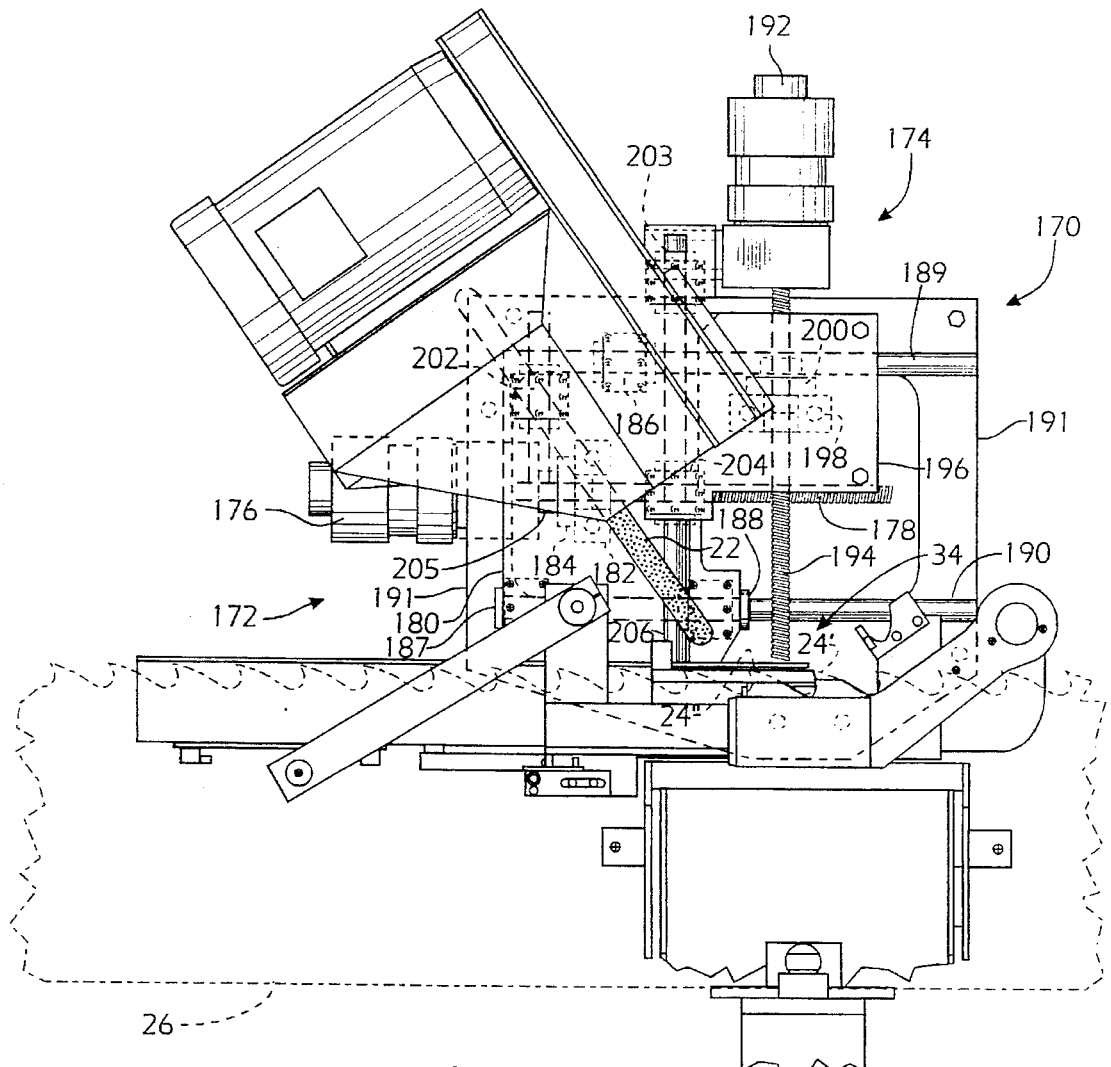
FIG. 16 is an enlarged front view of the motion assembly of FIG. 15.

After the current tooth is sharpened, carriage plate 116 is shifted back to the right, allowing finger 142 to pivot so that tip 142a enters the gullet of the next tooth to be sharpened. Plate 116 continues moving to the right, along with finger 142, forcing the band saw to advance the next tooth into position for sharpening, as shown in FIGS. 10 and 16. Jaws 82 and 84 are relaxed during indexing to a force of a few pounds to hold the saw in vertical alignment as it slides between them.

A boss 154 extends down from and is mounted to the rear side of finger 142. A brace element 156 extending up from and mounted to base 144 prevents finger 142 from rotating clockwise further from the position shown in FIG. 10. When a new tooth is being advanced into position for sharpening by finger 142, there is a clockwise force on the finger caused by the resistance in the band saw. Boss 154 pressing against element 156 resists this rotational force, thereby preventing the force from being applied to the ramp assembly including roller 151 and ramp element 152.

Figure 11:
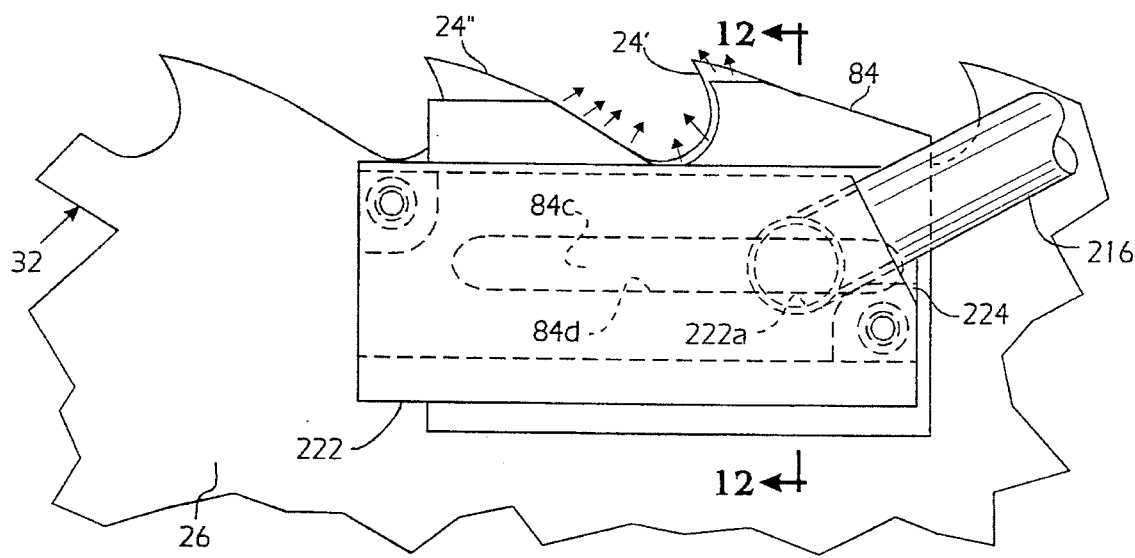
FIG. 11 is an enlarged front view of the band saw clamp shown in FIG. 4.
Figure 13:
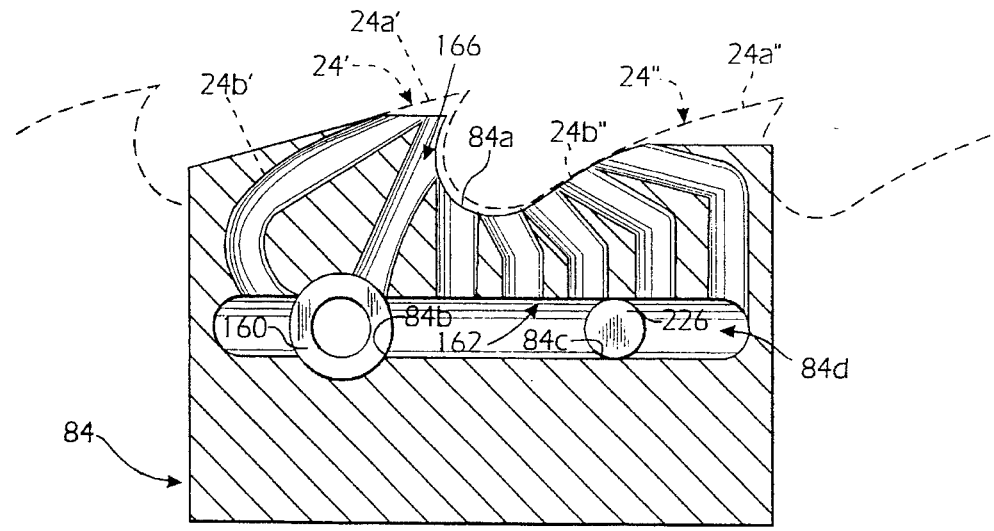
FIG. 13 is a cross section of a clamp jaw taken along line 13—13 in FIG. 12.
Figure 17:
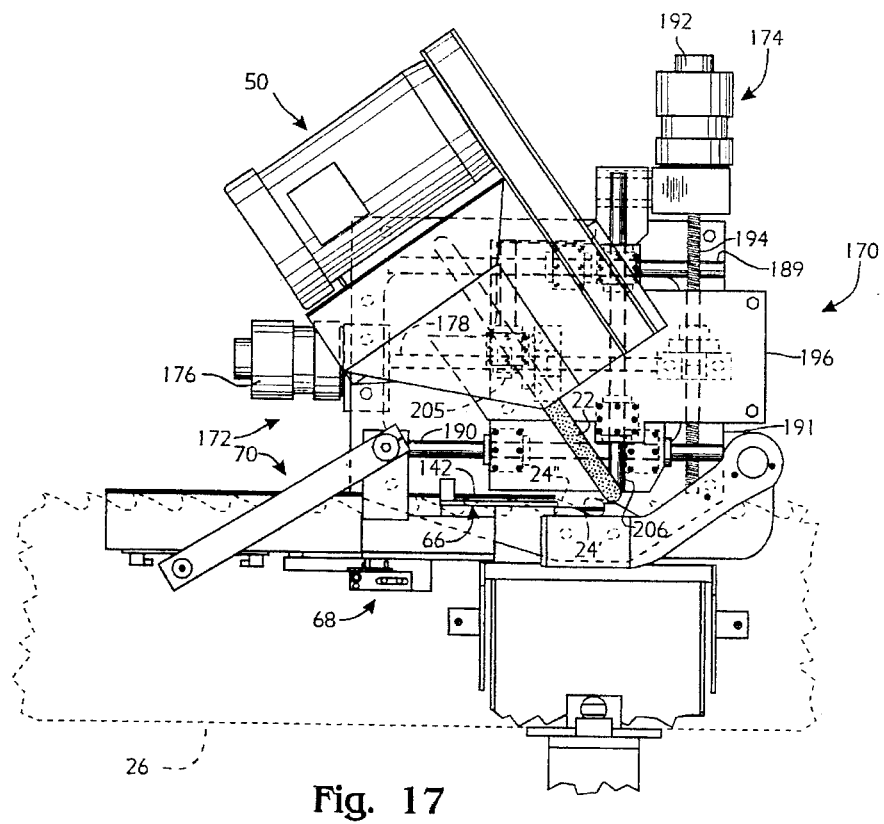
FIG. 17 is a view similar to FIG. 16 at a reduced scale showing the grinding wheel in a beginning grind position.
Figure 18:
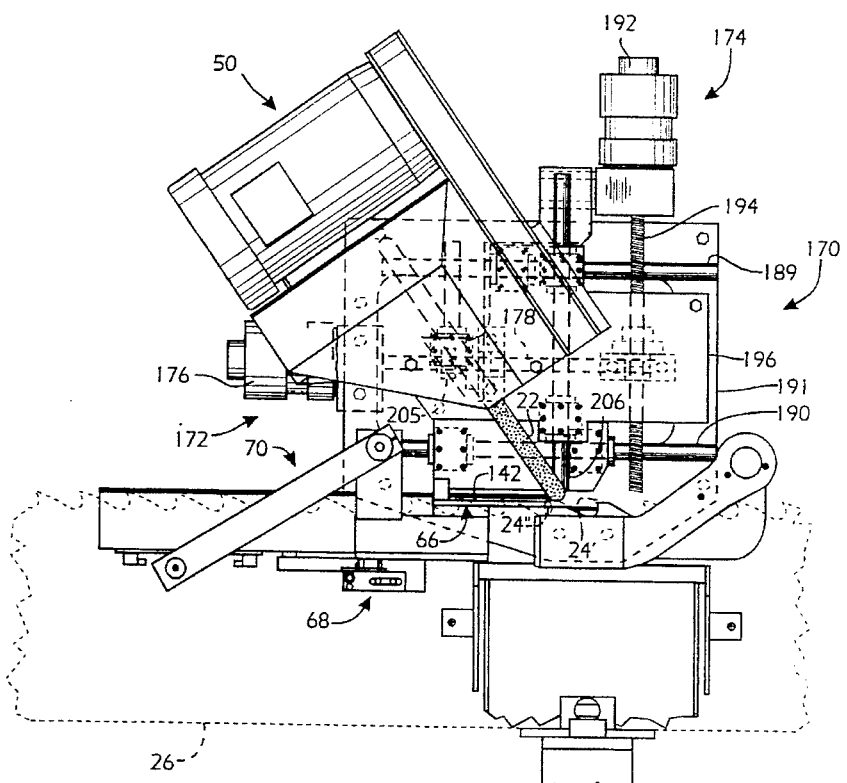
FIG. 18 is a view similar to FIG. 17 showing the grinding wheel in an ending grind position.

FIG. 17 shows the grinding wheel in position at the beginning of a grinding operation on the top back edge of a first tooth 24', which tooth is illustrated more clearly in FIGS. 11 and 13. The tooth extends above the top profile of the clamp jaws a sufficient amount to expose at least the amount of the tooth that is to be ground. The grinding wheel travels from the initial position shown in FIG. 17 to the tip of the tooth, moving to the left following the tooth profile until it gets to a position on the next tooth 24" corresponding to the position on tooth 24' where grinding began. This is the position shown in FIG. 18.

Figure 12:
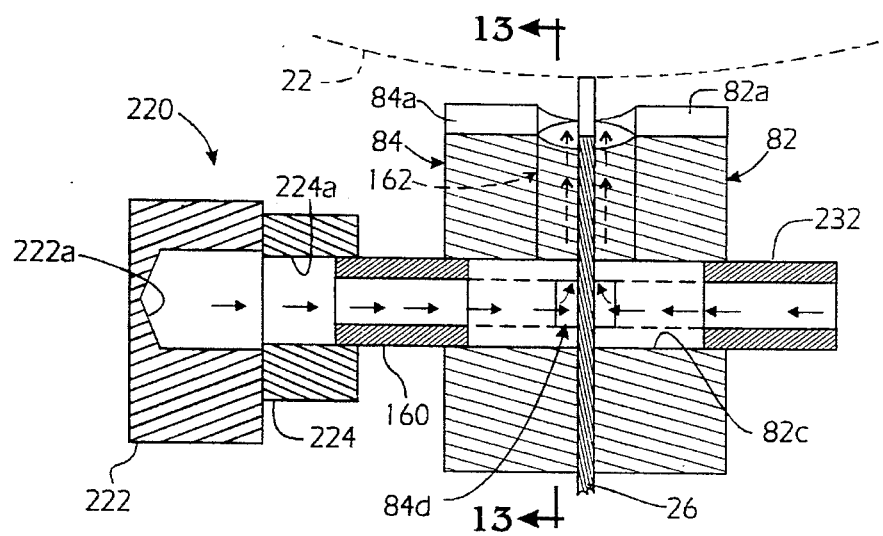
FIG. 12 is an end view of the clamp taken from the right side of FIG. 11.

The structure of jaws 82 and 84 are shown in greater detail in FIGS. 11–13. FIG. 11 shows an enlarged front view of the movable portion of the clamp assembly. FIG. 12 is a cross section taken along line 12—12 in FIG. 11, and also includes fixed clamp jaw 82 and an associated pin 160. FIG. 13 is a cross section of jaw 84 taken along line 13—13 in FIG. 12. This view is the same as a view of the face of jaw 84 contacting band saw 26. Jaw 82 is a mirror image of jaw 84.

It is seen that each jaw extends along the band saw approximately the length of two teeth. It has a height of about the equivalent of four times the height of a tooth. As an important feature of the present invention, it is seen that the jaws have upper edges 82a and 84a that conform generally to tooth upper edges 24a' and 24a". The only missing support is near the very tip of tooth 24a' along which grinding occurs. This is due primarily to the fact that tip 24a of each tooth in a saw is typically wider than the saw body, making clamping with planar-faced jaws impossible.

As shown in FIG. 13, both forward and rearward facing edges 24a' and 24b' of the tooth 24' extend well above the jaws, and the lower portion of rearward facing edge 24b" of the next tooth 24" is barely exposed. This conforms to the practice of sharpening the tooth tip itself, and sharpening the lower backside of the tooth less. Thus, the jaws are configured to provide the maximum support to the teeth while exposing as much of the teeth as will be ground.

Figure 14:
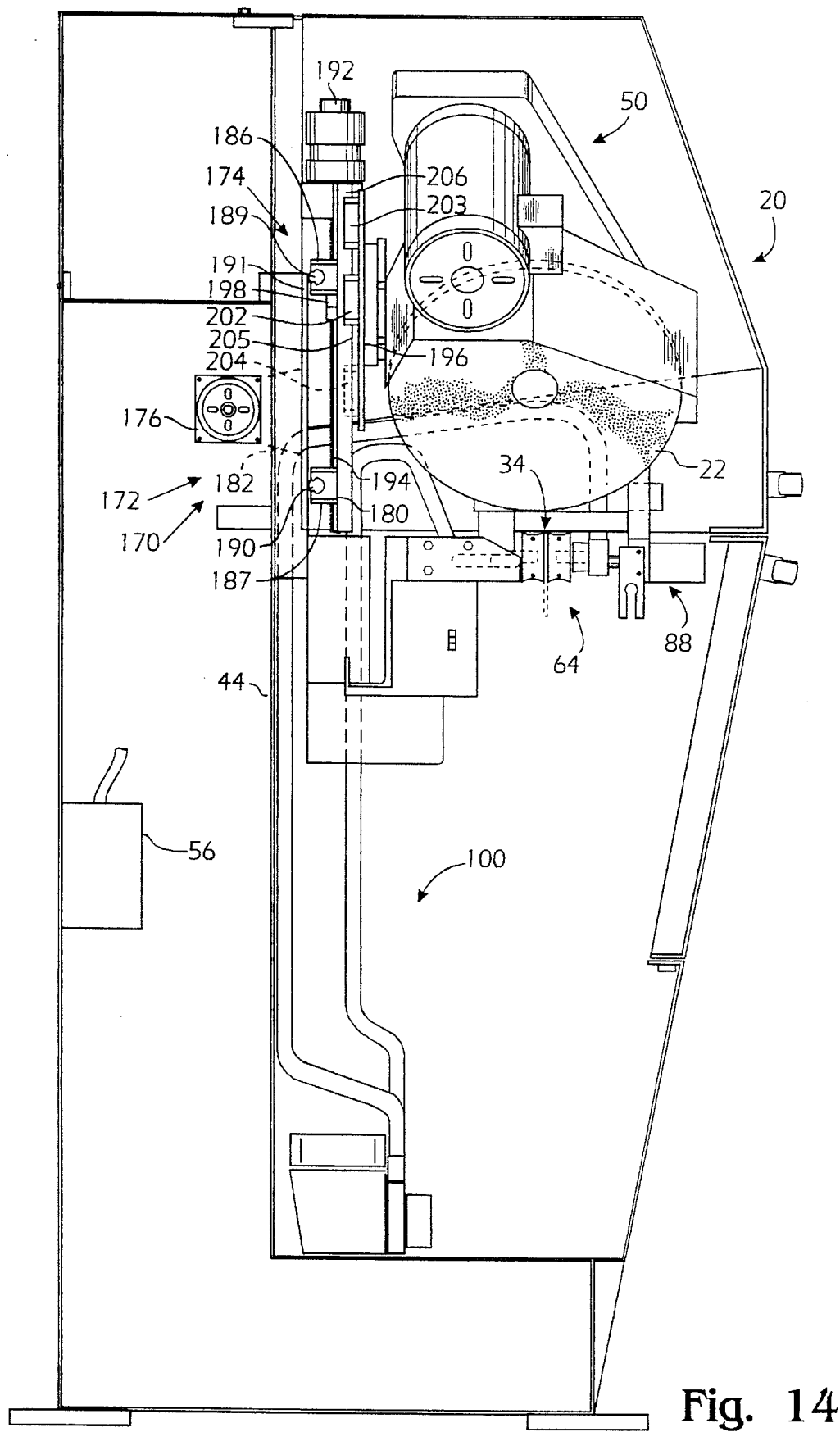
FIG. 14 is an end view similar to FIG. 7 showing the grinding wheel motion assembly with the grinding wheel in a home position showing coolant channels exposed to the band saw during sharpening.
Figure 15:
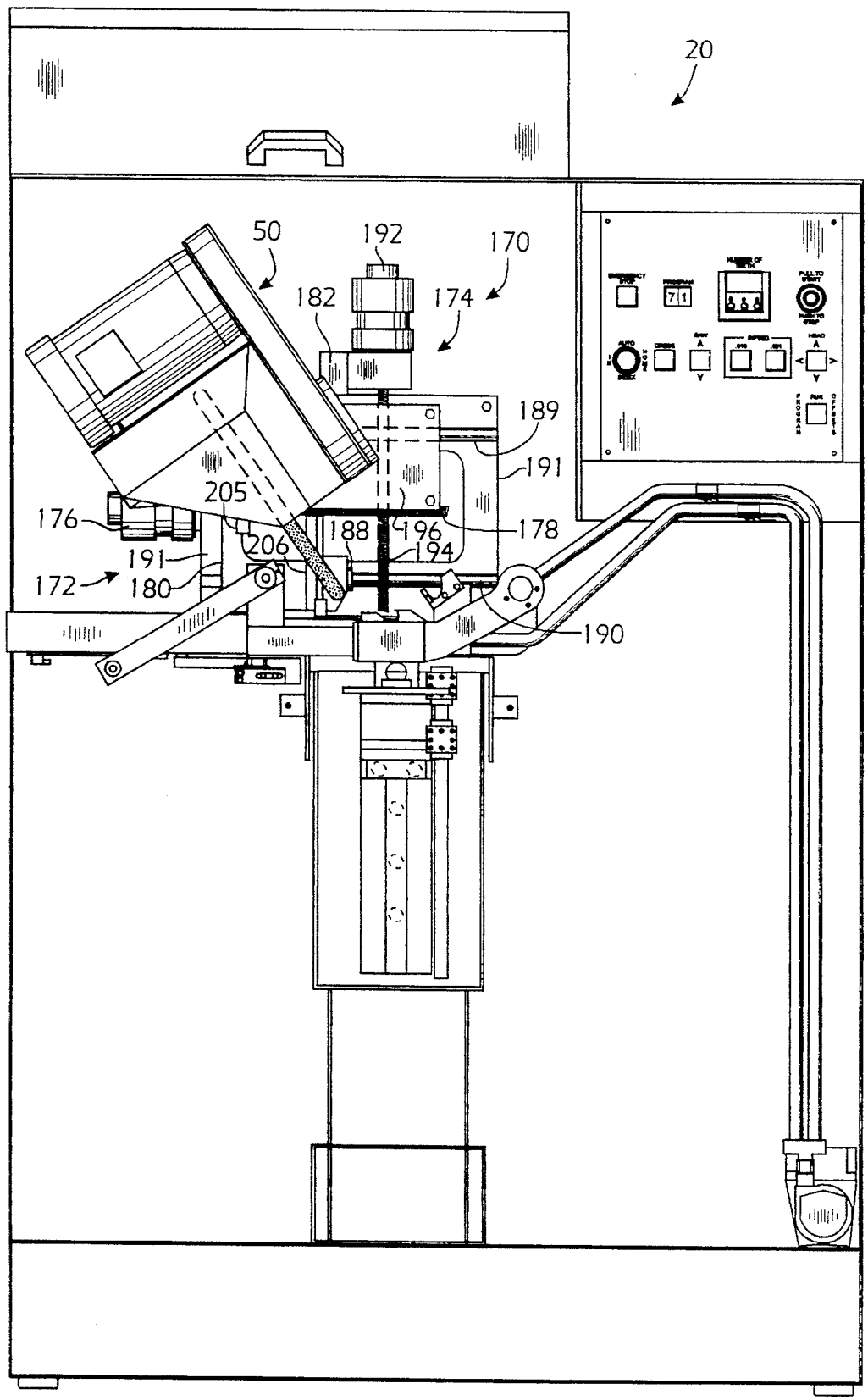
FIG. 15 is a front view similar to FIG. 2 showing the grinding wheel motion assembly with the grinding wheel in the home position.

As has been mentioned with reference to FIGS. 16–18, and as is also shown in FIGS. 14 and 15, movement of grinding wheel assembly 50 is provided by an X-Y drive assembly 170. X-Y drive assembly 170 includes an X or horizontal drive subassembly 172 and a Y or vertical drive assembly 174. Assembly 172 includes a servo motor 176 mounted in a fixed position relative to frame 44. The servo motor rotates a linear ball screw 178. An inner carrier plate 180 is connected to a nut plate 182 that mounts a nut 184 that is driven by screw 178. Plate 180 is supported in traveling horizontally by guides or trucks 186, 187 and 188 mounted slidingly on rails or tracks 189 and 190. These tracks are mounted on a base mounting plate 191 fixedly mounted to, and therefore a part of frame 44. Drive assembly 172 therefore drives carrier plate 180 horizontally along tracks 189 and 190.

Drive assembly 174 is structured similar to drive assembly 172 except that it provides for vertical movement of grinding wheel assembly 50 relative to carrier plate 180. More specifically, a second servo motor 192 is mounted to carrier plate 180. Motor 192 has an associated, vertically extending ball screw 194. A carrier plate 196 to which assembly 50 is fixedly mounted is attached to a second nut plate 198 that supports a nut 200. Nut 200, and therefore grinding wheel assembly 50, is driven by screw 194. Outer carrier plate 196 is maintained on its vertical travel path by trucks 202, 203 and 204 mounted to the plate. The trucks are slidingly mounted on tracks 205 and 206, as shown, mounted to inner carrier plate 180.

As has been mentioned, FIG. 16 shows X-Y drive assembly 170 positioned to place grinding wheel 22 in a home position removed from grinding station 34. When a new tooth 24' is secured in position in clamp assembly 64, servo motor 176 is activated to move carrier plate 180 to the right and servo motor 192 is activated to move carrier plate 196, riding on carrier plate 180, downwardly. This movement is controlled by a programmed pattern stored conventionally in memory in controller 56. The pattern must be determined from the teeth to be sharpened. FIG. 17 shows the position of the grinding wheel at the beginning of a sharpening cycle and FIG. 18 shows the position of the wheel at the end of the sharpening cycle. During automatic sharpening, the wheel is then raised above the saw teeth and returned to a corresponding beginning position while the band saw is indexed to advance the next tooth to be sharpened into position between jaws 82 and 84.

As has been mentioned, in order to minimize the buildup of heat in the band saw teeth, a coolant system 100 applies a coolant 210 to the tooth during grinding. The coolant system is shown variously in FIGS. 3, 5 and 10–13. In the bottom of cabinet 46 is a collection basin shown generally at 212 that receives the coolant that has been applied to the teeth through channels 162 in jaws 82 and 84, as has been described with reference to FIG. 13. The coolant is returned to the jaws by a sump pump 214. The pump directs the coolant through tubes 216 and 218.

Tube 216 directs the coolant to a movable clamp spacer assembly 220, including a spacer block 222 having an internal channel 222a connected to the tube. A spacer plate 224 attached to block 222 has an enlarged channel 224a aligned with channel 222a. Hollow pin 160 is slidingly received in channel 224a. A parallel solid pin 226 is slidingly received in a bore 224b. These pins are received with friction fit in corresponding channel 84b and bore 84c, respectively of jaw 84. Channel 84b leads to a coolant galley 84d from which channels 162, described previously, extend. The coolant expelled from channels 162 simply drop into basin 212 for recycling.

Similarly, tube 218 is connected to a channel 228a in a fixed block 228. Block 228 also has a bore 228b for receiving slidingly a solid pin 230 like pin 226. A hollow pin 232 is slidingly received in channel 228a. The opposite ends of these pins are frictionally received in corresponding bore 82*b* and channel 82*c*, as was the case for jaw 84, just described. Jaw 82 is a mirror image of jaw 84, and therefore has corresponding coolant galley and outlet channels. Coolant is distributed along the face of the jaw in the channels and all along the upper edge of the teeth being sharpened after the coolant leaves the channels.

The jaws themselves, being preferably formed of a suitable metal for strength, provides inherently a heat sink for the teeth, although it is not as rapid as applying the coolant. The passage of coolant through the channels along the face of the band saw and teeth also provides substantial cooling, in addition to the ejection of the coolant from the tops of the jaws. The preferred embodiment provides particularly effective cooling by ejecting coolant adjacent to the top of the tooth as the grinding wheel passes over the jaw toward the tooth. The moving grinding wheel thus tends to move the coolant onto the tooth. The preferred embodiment thus provides tooth cooling in several ways.

The use of pins for holding the jaws also has a particular advantage. As noted the jaws have a profile defined by the upper edges that conforms to the profile of the teeth being sharpened in order to maximize the lateral support of the teeth during sharpening, as has been discussed. Sharpener 20 can readily be modified in order to sharpen other teeth with a different profile. This is accomplished by simply opening the clamp jaws, removing the jaws and accompanying pins and replacing them with jaws having the profile of the other teeth. The new jaws have support pins as described, and are otherwise of similar structure. The jaws are thus readily interchangeable. Further, by selecting a corresponding sharpening pattern from a library of patterns that can be stored in controller 56 by conventional techniques, the sharpener is ready to receive the other band saw and begin the sharpening sequence, as has already been described.

Figure 19:
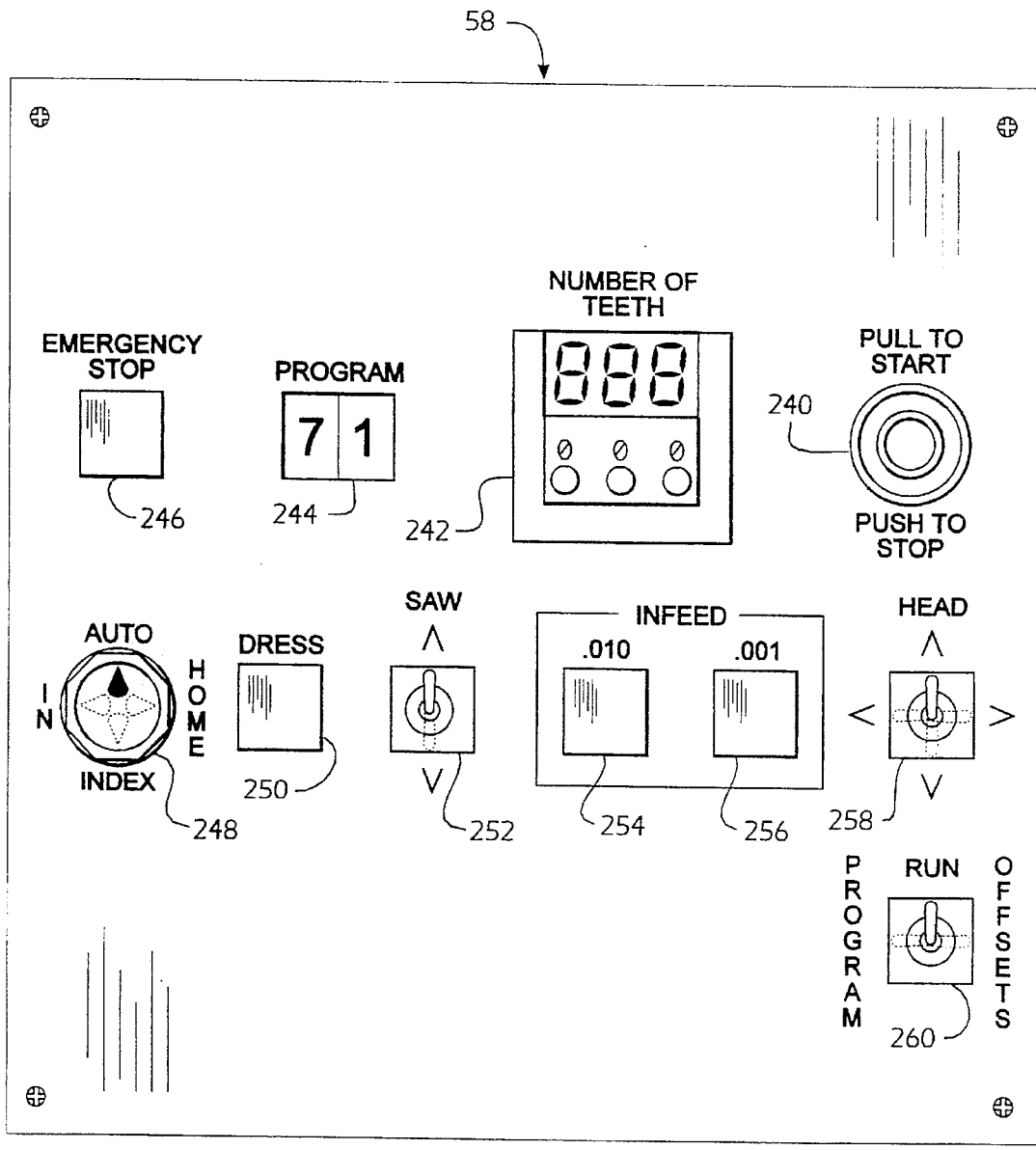
FIG. 19 is an enlarged view of the control panel shown in FIG. 2.

An enlarged view of control panel 58 is shown in FIG. 19. The control panel provides manual input into the functions of CNC controller 56. A first row of controls includes a button 240 that is pulled to start operation and pushed to stop. A manually settable display 242 is used to input into the controller the number of teeth that are to be sharpened. The selection of a program is made at a program selector 244. Thumb wheels, not shown, are used to select two digits corresponding to a selected program. A program includes both the tooth profile to be followed by the grinding wheel and the speed to be used for the grinding process. A slower speed results in slower movement of the grinding wheel along the tooth profile, resulting in a more accurate grind. Also, smaller teeth require less grinding time than larger teeth. An emergency stop button 246 is used to stop action of sharpener 20 in whatever state it is in when the button is pushed.

The second row of controls a selector switch 248 having four positions providing manual sequencing of the sharpening procedure. The right position moves the grinding wheel to the home position. The left position moves it into position for grinding a tooth. The down position indexes a band saw supported in the sharpener. The up position puts these functions in an automatic mode for control by controller 56 during a normal sharpening sequence.

The next control to the right is a button 250 that operates the grinding wheel in a fixed position so that an operator can manually activate the wheel-dressing routine. The "dress" routine may also be programmed to activate every time a selected number of teeth have been sharpened. The position of band saw carrier 60 is controlled by button 252. A down position lowers the carrier to allow loading or unloading of a band saw. The up position raises the carrier to put the saw in position for sharpening the teeth.

The amount of grinding to be performed relative to a base position of the grinding wheel is controlled by buttons 254 and 256. Button 154 increments the position by a distance of 0.010 inches each time it is pressed, and button 156 increments the position 0.001 inches with each push. Manual control of the position of the grinding wheel assembly, referred to as a "head", when the sharpener is not operating, is controlled by a four-direction controller switch 258. The position of the head is moved up, down, left and right by pressing the switch in the corresponding direction.

Finally, panel 58 includes a supervisory switch 260 that is used to select program, run or offsets modes of operation. In the program mode, the sharpener is inactive, while the operator inputs the program selection desired. If offsets from a selected program are desired, this switch is set to offsets, during which the offsets are set by control of the grinding wheel base position. During normal, automatic grinding operations, switch 260 is set at the run position.

Sharpener 20 is thus seen to have many advantageous features. It accommodates both left and right-hand band saws, circular and band saws with different tooth profiles, and provides for loading the main run and the return run of the band saw at the front of the band saw. Both runs of the band saw are supported on a single carriage, and are indexed in opposite directions by action of a single, reciprocating drive plate. Opposing jaws conform generally to the tooth profile, securely clamp the sides of teeth being sharpened in a fixed position, and provide coolant directly to the tooth edges being sharpened. Exact tooth profiles are reliably tracked by a CNC controller and servo motor-based X-Y drive assembly.

It will be apparent, therefore, to one skilled in the art that variations in form and detail may be made in the preferred embodiment while providing various of these features without varying from the spirit and scope of the invention as defined in the claims and any modification of the claim language or meaning as provided under the doctrine of equivalents. For instance, the jaws can have different profiles for supporting the same or different teeth, and the coolant can be applied in a different configuration of channels, or even through channels separate from the jaws. The indexing of the saw can be done independently and with other apparatus. Different grinding wheel movement patterns and drive assemblies can be provided. The preferred embodiment is thus provided for purposes of explanation and illustration, but not limitation.

I claim:

1. An apparatus for automatically sharpening teeth of a continuous band saw in which the teeth have a known profile, the apparatus comprising:

a frame supported relative to a floor and having a front side;

means for supporting a first portion of the band saw at the front side of the frame;

means for supporting a second portion of the band saw relative to the frame, parallel with the first portion of the band saw, and also at the front side of the frame;

a pair of plates having upper edges generally conforming to the profile of a tooth;

means for pressing the pair of plates toward each other with the first portion of the band saw positioned between the plates and the top edge of a tooth of the band saw extending above the upper edges of the plates during sharpening, whereby a substantial portion of the tooth is supported between the plates in a fixed position relative to the frame, the pressing means being releasable for allowing movement of the first portion of the band saw between the plates for positioning a different tooth between the plates;

grinding wheel means for grinding the top edge of the tooth supported by the plates;

means for moving the grinding wheel means along the tooth upper edge following a predetermined path representative of the tooth profile for grinding the edge of the supported tooth; and means for advancing selectively the first portion of the band saw in a first direction relative to the frame for positioning teeth successively between the plates for sharpening, and advancing the second portion of the band saw in the opposite direction relative to the frame.

2. An apparatus for automatically sharpening the teeth of a continuous saw having teeth with the same shape, comprising:

means extending along at least one side of a tooth of the saw with the edge of the tooth exposed in a sharpening zone for bracing the tooth during sharpening, the bracing means comprising a plate conforming to at least a portion of the shape of the teeth;

grinding wheel means positioned in the sharpening zone adjacent to the edge of the braced tooth;

means for moving the grinding wheel means relative to the saw for grinding the edge of the braced tooth; and means for advancing the saw for presenting teeth successively in the sharpening zone.

3. An apparatus according to claim 2 wherein the grinding wheel means moves across the tooth edge in a predetermined direction, and a point on the grinding wheel means passes the tooth before passing the plate, thereby pressing the tooth against the plate.

4. An apparatus according to claim 2 wherein the bracing means further comprises a second plate extending along the other side of the tooth, the apparatus further comprising means for pressing the first and second plates toward each other.

5. An apparatus according to claim 2 wherein the plate has channel means with an outlet adjacent to the tooth edge, the apparatus further comprising means for directing a liquid coolant through the channel means and thereby onto the tooth adjacent to the tooth edge.

6. An apparatus according to claim 5 wherein the grinding wheel means moves across the tooth edge in a predetermined direction, and a point on the grinding wheel means passes the plate before passing the tooth edge, thereby drawing the coolant toward the tooth edge.

7. An apparatus according to claim 5 wherein at least a portion of the channel means is open to a side of the plate facing the tooth and the tooth and plate when pressed together close the side of the channel means facing the tooth, whereby coolant flowing in the channel means contacts the tooth face prior to exiting through the outlet.

8. An apparatus according to claim 5 wherein the channel means has a plurality of outlets distributed along the tooth edge.

9. An apparatus according to claim 2 wherein the plate has channel means open to a side of the plate facing the tooth and the tooth and plate when pressed together close the side of the channel means facing the tooth, the apparatus further comprising means for directing a liquid coolant into the channel means whereby the coolant passes along the associated face of the tooth in the channel means.

* * * * *